(12) United States Patent
Wilkins (10) Patent No.: US 6,368,474 B1
(45) Date of Patent: Apr. 9, 2002

(54) CHLORINE GENERATOR

(75) Inventor: Larry C. Wilkins, Georgetown, IN (US)

(73) Assignee: Electromechanical Research Laboratories, Inc., New Albany, IN (US)

( * ) Notice: Subject to any disclaimer, the term of this patent is extended or adjusted under 35 U.S.C. 154(b) by 0 days.

(21) Appl. No.: 09/571,832

(22) Filed: May 16, 2000

(51) Int. Cl.$^7$ ................................................ C25B 9/00
(52) U.S. Cl. ...................... 204/266; 204/271; 204/284; 204/292
(58) Field of Search ............... 204/266, 271, 204/284, 292; 294/137–172

(56) References Cited

U.S. PATENT DOCUMENTS

| | | | |
|---|---|---|---|
| 534,259 A | 2/1895 | Garuti | 204/258 |
| 1,212,229 A | 1/1917 | Jones | 204/258 |
| 1,246,099 A | 11/1917 | Hulin | 205/618 |
| 3,291,708 A | 12/1966 | Juda | 205/618 |
| 3,574,083 A | 4/1971 | Pewitt | 204/258 |
| 3,623,969 A | * 11/1971 | Hushihara | 204/271 |
| 3,962,065 A | 6/1976 | Scoville | 204/256 |
| 4,076,603 A | 2/1978 | Andersen | 204/98 |
| 4,107,022 A | 8/1978 | Strempel et al. | 204/265 |
| 4,120,772 A | 10/1978 | Kadija | 204/252 |
| 4,142,950 A | 3/1979 | Creamer et al. | 204/96 |
| 4,230,544 A | 10/1980 | McRae | 204/98 |
| 4,290,873 A | 9/1981 | Weaver | 204/228 |
| 4,316,787 A | 2/1982 | Themy | 204/242 |
| 4,426,261 A | 1/1984 | Fushihara | 204/98 |
| 4,555,323 A | 11/1985 | Collier | 204/258 |
| 4,613,415 A | 9/1986 | Wreath et al. | 204/98 |
| 4,683,040 A | 7/1987 | Seko | 204/98 |
| 4,683,041 A | 7/1987 | Seko | 204/98 |
| 4,693,806 A | 9/1987 | Tucker | 204/252 |
| 4,744,877 A | 5/1988 | Maddock | 204/266 |
| 4,767,511 A | 8/1988 | Aragon | 204/128 |
| 4,772,364 A | 9/1988 | Dempsey et al. | 204/98 |
| 5,053,114 A | 10/1991 | Maddock | 204/252 |
| 5,094,734 A | 3/1992 | Torrado | 204/234 |
| 5,133,848 A | * 7/1992 | Meyers | 204/266 |
| 5,254,233 A | 10/1993 | Nakao et al. | 204/257 |
| 5,411,641 A | 5/1995 | Trainham et al. | 204/59 |
| 5,779,874 A | 7/1998 | Lemke | 205/334 |

OTHER PUBLICATIONS

Information published at Internet website: http://home.att.net/~Safe–T–clor/Prod–2.htm (10 pages).
Information published at Internet website: http://www.clorinators.com/safetclor.htm (5 pages).

* cited by examiner

Primary Examiner—Donald R. Valentine
Assistant Examiner—Thomas H Parsons
(74) Attorney, Agent, or Firm—Woodard, Emhardt, Naughton Moriarty & McNett (57) ABSTRACT

A portable apparatus for generating chlorine from common salt preferably includes a base with a passageway in it, a first liquid-holder extending upward from the base in fluid communication with one end of the passageway, and a second liquid-holder extending upward from the base in fluid communication with the other end of the passageway. An anode and a cathode are disposed in the passageway, with an ion-selective membrane positioned between them. The electrodes preferably include an electrolyte-contacting portion positioned in the passageway, and an electrical connection portion that extends outward away from the passageway. An electrode-holder effective to prevent liquid from leaking out of the passageway is preferably included on each electrode. Sight tubes to facilitate observation of the liquid levels in the liquid-holders are also preferably included, as is a handle to facilitate carrying and/or hanging the generator.

5 Claims, 8 Drawing Sheets

CHLORINE GENERATOR

BACKGROUND OF THE INVENTION

1. Field of the Invention

The present invention relates generally to chlorine generators, and more particularly to a portable chlorine generator that can be used in the field to generate chlorine from common salt to sanitize water.

2. Description of the Related Art

The lack of clean, potable water is a significant concern in many undeveloped and/or devastated areas, and particularly in areas affected by war or natural disasters such as hurricanes, earthquakes, volcanic eruption, etc. Unfortunately though, these areas frequently have shortages of electric power as well as water, and the ability to transport large sanitation units into such areas may also be limited. Moreover, the people available to operate water sanitation equipment in remote or devastated areas may not be trained or equipped to handle the hazardous chemicals that are generally required.

The most commonly used chemicals for sanitizing water are halogen oxidizers, particularly chlorine-containing compounds. Halogen-containing compounds are generally strong oxidizing agents, and are therefore effective against bacteria, fungi, and algae. Unfortunately though, their strong oxidizing power makes them hazardous to handle and to store, making their use in areas affected by war or natural disaster problematic at best.

A method for providing chlorine gas from common salt has been known for many years. In that method, the salt is "cracked" in an electrochemical cell to provide chloride ions and sodium ions. The ions are separated by an ion-selective membrane that allows either hydroxyl ions or chloride ions to pass through, thus isolating sodium hydroxide in the electrolyte on one side, and chlorine gas in the electrolyte on the other.

One device for practicing this "chlor-alkali cell" technology is the SAFE-T- chlor on-site chlorine gas generator marketed by Chemical Injection Technologies, Inc. ("CIT"). That system uses large buckets or drums as the anode chamber and the cathode chamber, and connects them with a series of hoses. While the CIT system may be effective for the large-scale generation of chlorine, it is not practical for use in the field as described above.

A need therefore exists for a portable chlorine generator that converts common salt to chlorine gas that can be used to sanitize water. The present invention addresses that need.

SUMMARY OF THE INVENTION

Briefly describing one aspect of the present invention, there is provided a portable apparatus for generating chlorine from common salt. The apparatus uses DC current to crack the salt in an electrochemical cell having an anode separated from a cathode by an ion-selective membrane. Water serves as the electrolyte.

The apparatus preferably comprises a base with a passageway in it, with a first liquid-holder in fluid communication with one end of the passageway, and a second liquid-holder in fluid communication with the other end of the passageway. An anode and a cathode are both disposed in the passageway, with an ion-selective membrane positioned between them.

The electrodes are preferably made of expanded titanium, and have an electrolyte-contacting portion positioned in the passageway, and an electrical connection portion extending outward away from the passageway. An electrode holder effective to sealingly hold the electrode in the passageway, and thereby to define the electrolyte-contacting portion and the electrical connection portion, is also preferably included on each electrode.

The ion-selective membrane is effective for preventing the passage of chloride ions through said membrane, so chlorine gas will collect in the anode side of the cell. From there, it can be released via a gas outlet communicating with the first liquid holder. A venturi may be used to facilitate the removal of chlorine gas from the generator.

Sight tubes to facilitate observation of the liquid levels in the liquid-holders may also be included, as may be a handle to facilitate carrying and/or hanging the generator.

One object of the present invention is to provide an inexpensive, durable, and easily portable chlorine generator that can be used in the field to sanitize water.

Other objects and advantages will be apparent from the following description.

DETAILED DESCRIPTION OF THE INVENTION

For the purposes of promoting an understanding of the principles of the invention, reference will now be made to the illustrated embodiment, and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

Figure 1:
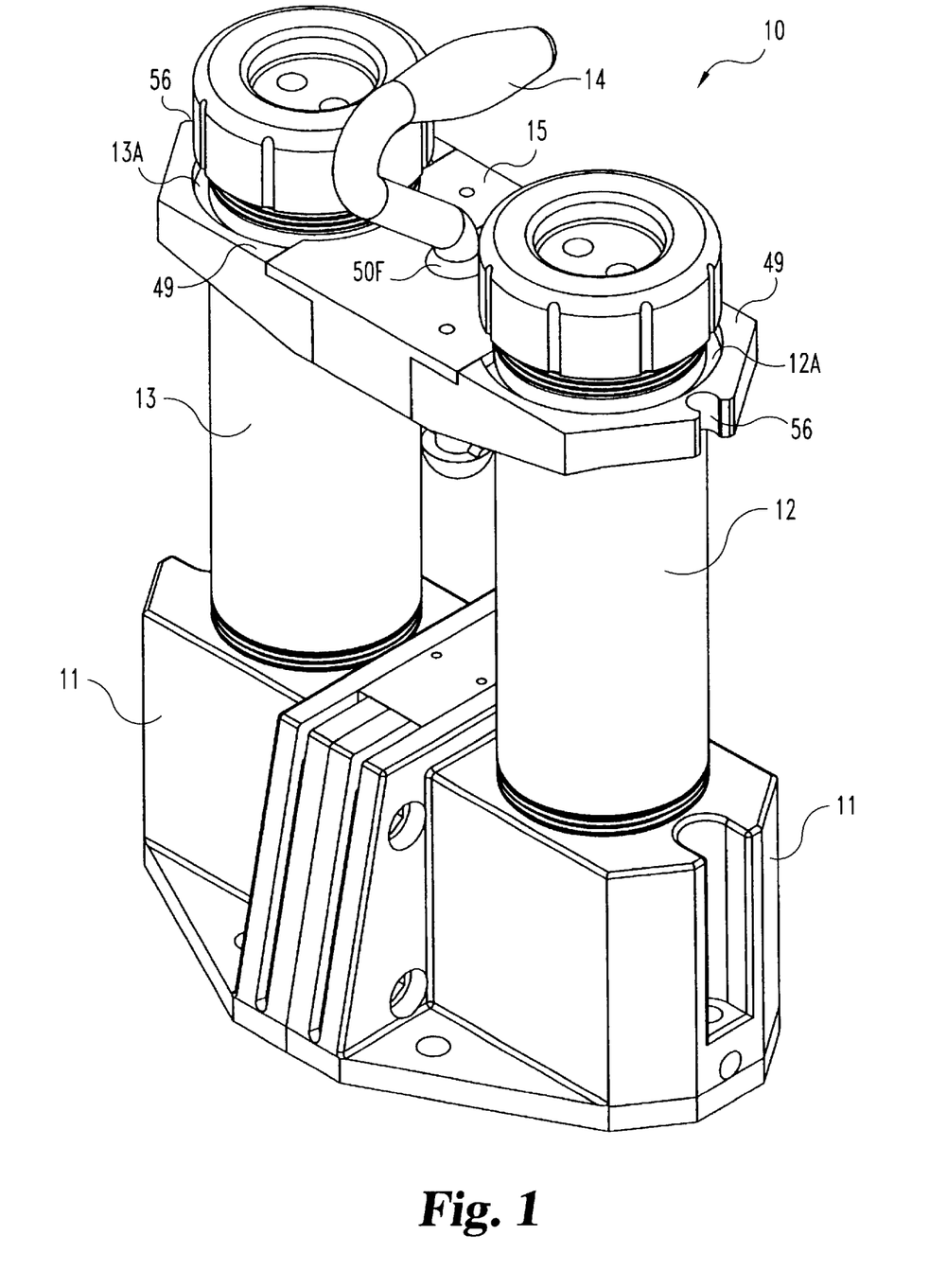
FIG. 1 is a perspective view of the chlorine generator of the present invention, according to one preferred embodiment.

Referring first to the drawings, FIG. 1 shows the chlorine generator of the present invention, without the sight tubes attached. In that embodiment chlorine generator 10 includes a base 11, first liquid-holder 12, and second liquid-holder 13. Handle 14 is supported by handle support 15.

Figure 2:
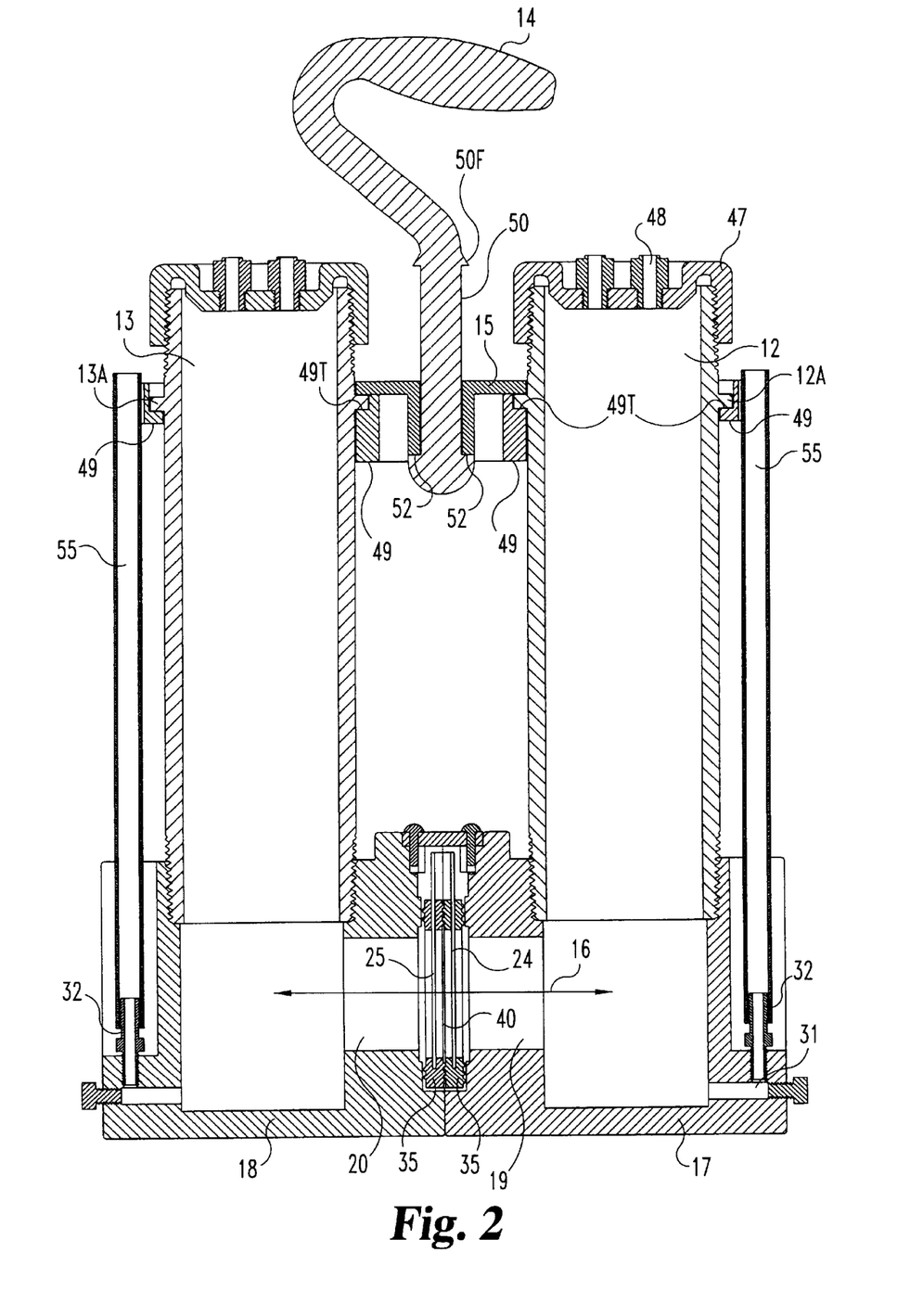
FIG. 2 is a front elevational view of one embodiment of the chlorine generator of the present invention, in full section.

FIG. 2 shows the chlorine generator in section view, and shows how base 11 includes a passageway 16 in liquid communication with liquid-holders 12 and 13. In one preferred embodiment, base 11 is made in two pieces, and thus includes a first end portion 17 and a second end portion 18. The first end portion includes the first end portion 19 of passageway 16, and communicates with first liquid-holder 12. The second end portion includes the second end portion 20 of passageway 16, and communicates with second liquid-holder 13. It is to be appreciated that it is not necessary to make the base in two pieces, a one-piece base will also have a first end portion and a second end portion, and is desired to be within the scope of the present invention as disclosed herein.

Figure 3:
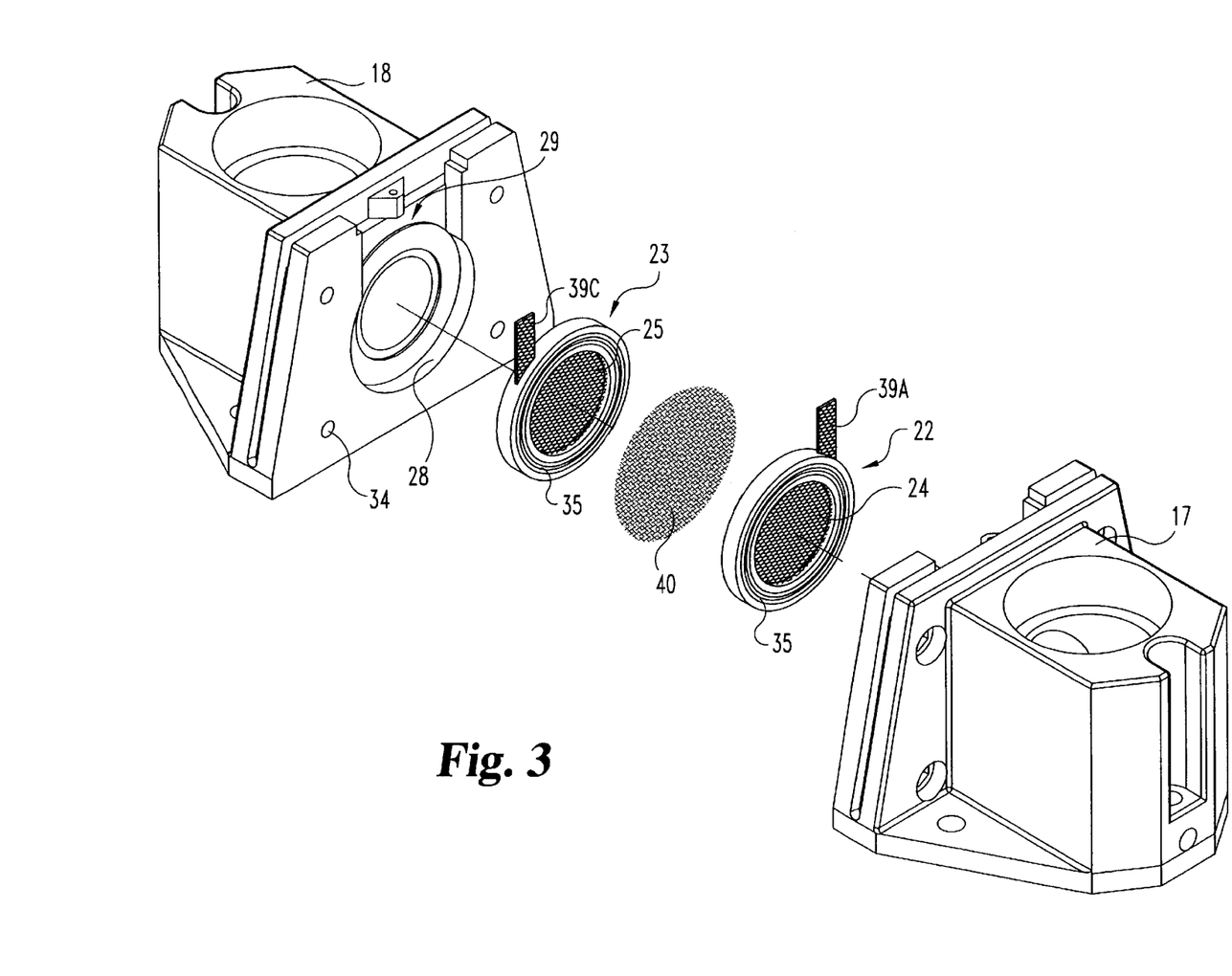
FIG. 3 is an exploded perspective view of the base of the chlorine generator of the present invention, according to one preferred embodiment, showing the electrodes and ion-selective membrane that are disposed therein.

As shown in FIG. 3, first base end portion 17 and second base end portion 18 each may include a recess 28 for receiving an electrode and positioning it in the passageway. In the illustrated embodiment recess 28 is open at the top 29 to provide a space for the electrical connection portions of the electrodes.

Figure 4:
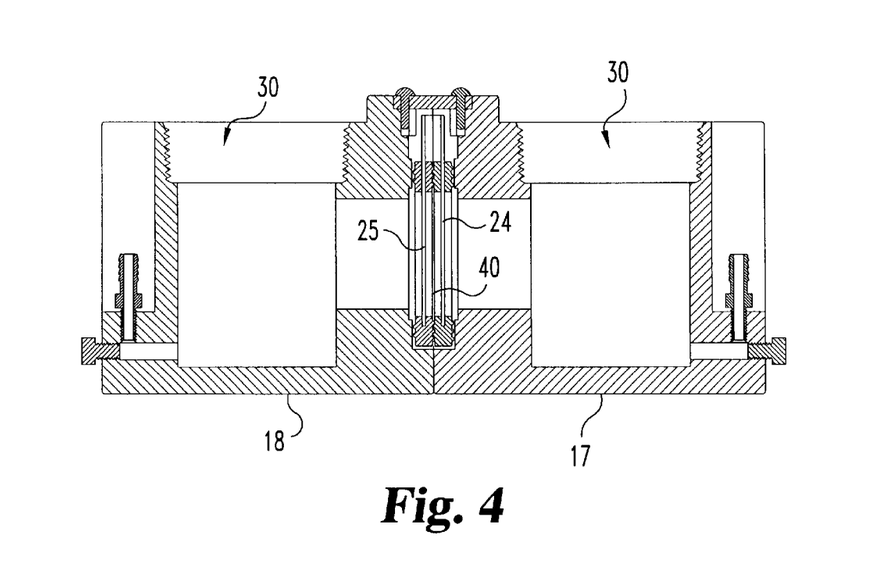
FIG. 4 is a front elevational view of one embodiment of the base of the chlorine generator of the present invention, in full section.

As shown in FIG. 4, first base end 17 and second base end 18 may each define a reservoir 30 where the passageway joins the liquid-holders. In the illustrated embodiment, reservoir 30 is threaded at its upper end to receive a matingly-threaded liquid holder. The reservoir 30 also communicates with sight tube passageway 31 which terminates in nipple 32 for receiving a sight tube.

When base 11 is made in two or more pieces it may also include one or more apertures 34 through which fasteners for sealingly engaging first base end 17 to second base end 18 may pass. Any fasteners, such as bolts, screws, pins, etc., that securely couple the pieces of the base may be used.

Anode 22 and cathode 23 are positioned in passageway 16 of base 11, for example as shown in the drawings, particularly FIGS. 2, 3, and 4. Most preferably, anode 22 and cathode 23 are each made of a metal mesh material, such as expanded titanium, that allows liquid to pass through the passageway. In that embodiment, anode 22 and cathode 23 may extend over the entire cross-sectional area of the passageway to maximize contact with the liquid contained therein. Alternatively, the electrodes may reside in the passageway without covering it.

As shown in FIG. 3, anode 22 and cathode 23 each include an electrolyte-contacting portion, 24 and 25 respectively, where the electrode occupies passageway 16. As indicated above, the electrolyte-contacting portions of electrodes 22 and 23 may be made of expanded titanium, although other materials such as carbon, graphite, platinum, zinc, lead, silver, stainless steel, etc. may be used. An expanded metal, with its open mesh structure, provides a greater surface area for the electrolytic reaction, and thus allows a greater amount of chlorine gas to be produced.

A catalytic coating may also be provided on the surface of the electrode(s), and particularly the anode, to facilitate the electrolytic reaction. In one preferred embodiment the anode is coated with a ruthenium coating to prevent the electrode from forming an electrically resistive layer on its surface.

Figure 8:
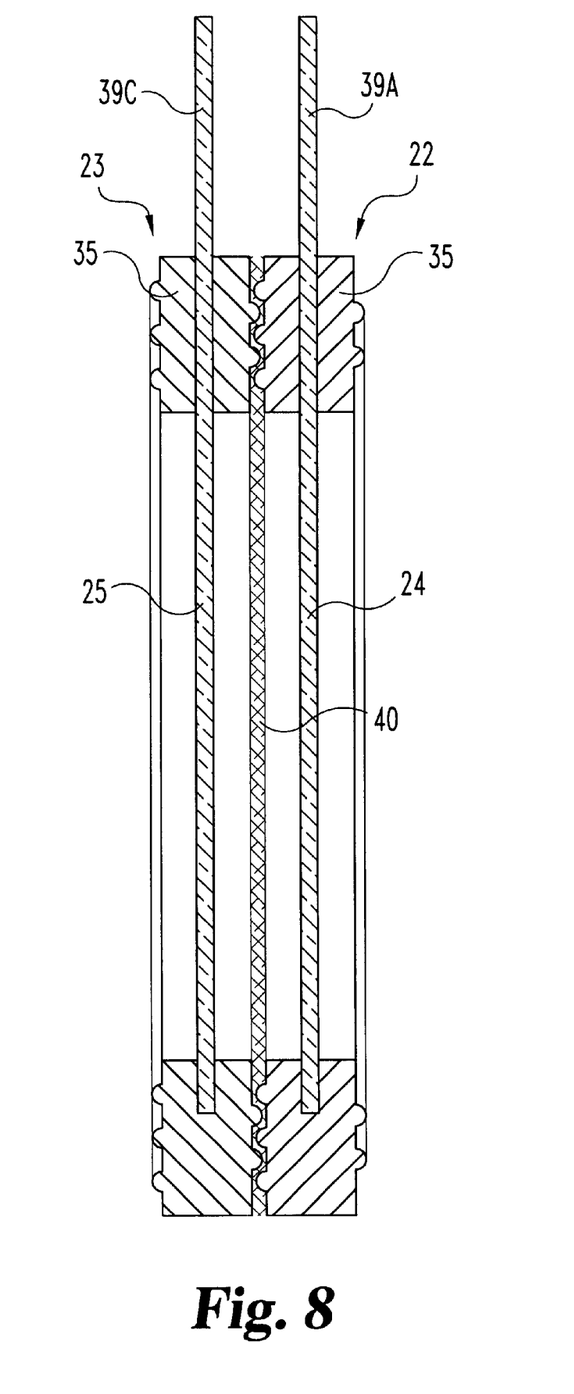
FIG. 8 is an enlarged sectional view of the electrode-holder-membrane junction, according to one preferred embodiment of the present invention.

As shown in FIGS. 3 and 8, the electrode assemblies may each include a non-conductive electrode holder 35 around their circumference, i.e., substantially surrounding the outer edges of the electrodes. These electrode holders serve several functions. First, they space the two electrodes the proper distance apart. Second, they seal the electrodes in the passageway so that liquid does not escape from around the electrodes. Third, they hold an ion-selective membrane 40 between the anode and cathode so that ions are selectively retained on one side of the cell. In one preferred embodiment, the electrode holders are made of an elastomeric material, and include inter-fitting ribs and grooves on their surfaces to provide a better seal, both against the seal surfaces of the base, and against the ion-selective membrane positioned between the electrodes.

Anode 22 and cathode 23 may also each include an electrical connection portion such as tab 39 projecting outward from the electrolyte-contacting portion of the electrode. In the illustrated embodiment, the tab is an extension of the expanded titanium mesh that serves as the electrode surface. In that embodiment, the tab passes through the electrode holder so that the electrode holder seals the functional portion inside the passageway and the tab portion outside the passageway. When the electrolyte-contacting and electrical connection portions of the electrodes are made from a single piece of metal mesh material, the strength of the electrode assembly is improved and the electrical connection is less likely to break.

Ion selective membrane 40 is positioned between anode 22 and cathode 23 to prevent the flow of certain ions from one electrode to the other. In the illustrated embodiment, ion-selective membrane 40 is a cation-exchange membrane that allows sodium ions to travel from the anode chamber to the cathode chamber, but does not allow negatively charged chemical species, such as hydroxide ions, to be transported across the membrane, such as from the cathode chamber to the anode chamber. With this arrangement, chloride ions are kept in the anode chamber, where they accumulate to produce chlorine gas. The chlorine gas rises out of the electrolyte solution due to its low density, and is thus easily removed from the generator.

Ion-selective membrane 40 is preferably made out of a perfluorosulfonate polymer known as a NAFION membrane. However, the membrane may also be a perfluorocarboxylate membrane such as a FLEMION membrane, or may be a bonded membrane such as a film of perfluorosulfonate polymer bonded to a Teflon reinforcing fabric and a perfluorocarboxylate polymer. Any ion-selective membrane that allows sodium ions to pass from the anode chamber into the cathode chamber, while preventing chloride ions from leaving the anode chamber, may be used.

Liquid-holders 12 and 13 may be screwed into the base so that they communicate with passageway 16 as shown in the drawings. In the illustrated embodiment, first liquid-holder 12 is in fluid communication with first end 19 of passageway 16, while second liquid-holder 13 is in fluid communication with second end 20 of passageway 16.

Liquid holders 12 and 13 both hold electrolyte solution, which preferably begins as water. As the generator produces chlorine, the electrolyte in the anode chamber becomes concentrated in chloride ions, while the electrolyte in the cathode side becomes concentrated in sodium hydroxide. Liquid holder 12 may also hold some of the salt that is provided to the anode chamber of the generator.

Liquid holder 12 may be capped with a cap 47 that includes gas outlets 48. Gas outlets 48 allow the removal of the chlorine gas in a safe and controlled manner, and prevent the uncontrolled release of chlorine gas into the atmosphere. Liquid holder 13 may also be capped with a similar cap.

As indicated above, the chlorine generator of the present invention is a portable unit that can easily be carried by hand and used in the field where there may not be AC power. The generator operates on DC power, such as may be provided from an automobile battery.

Figure 5:
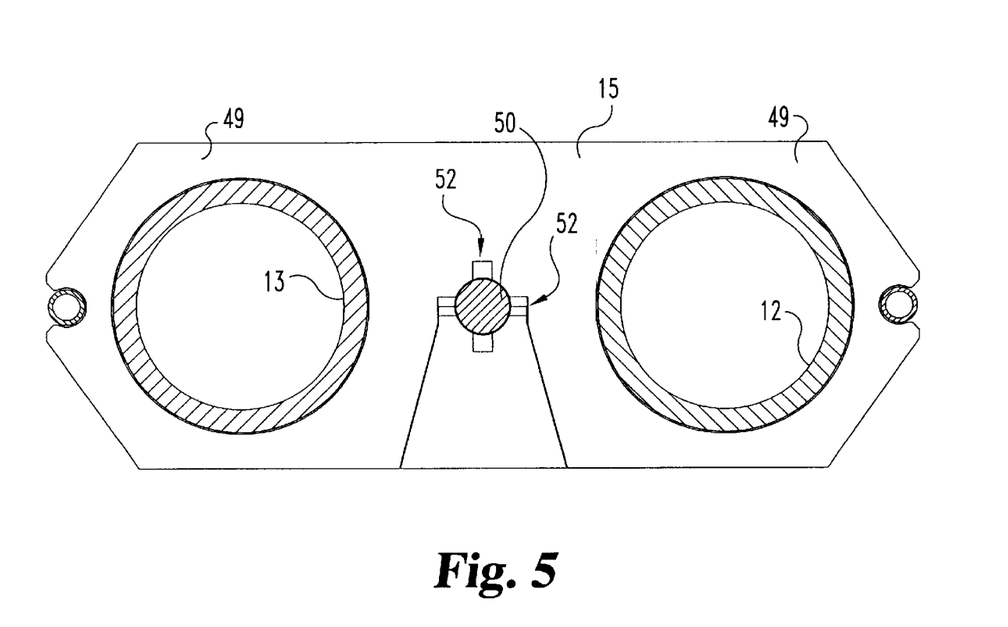
FIG. 5 is a bottom plan view of the handle support member/bridge assembly of the chlorine generator of the present invention, according to one preferred embodiment, showing the liquid holders and the handle in cross section.
Figure 6A:
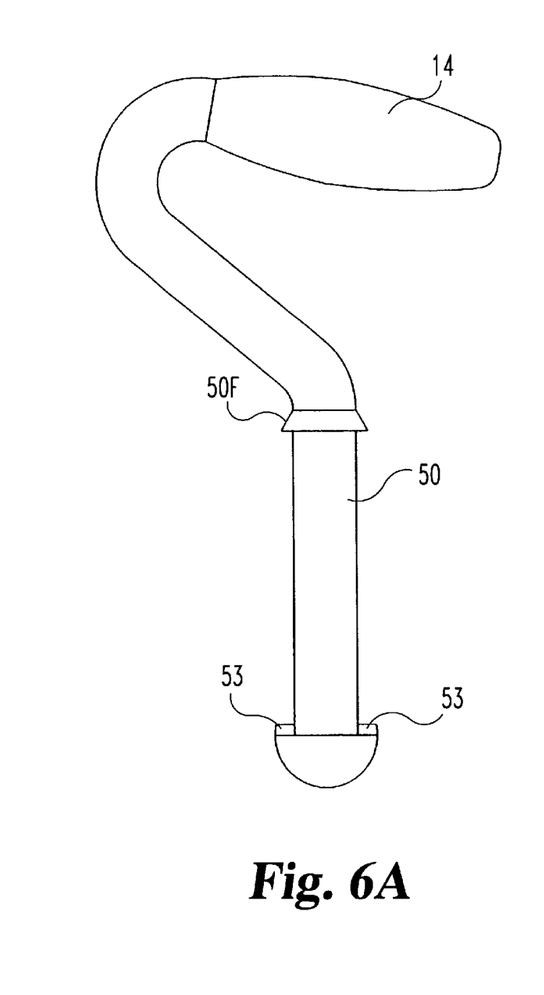
FIG. 6A and FIG. 6B are front and side elevational views of one of the preferred embodiments of the handle of the chlorine generator of the present invention.
Figure 6B:
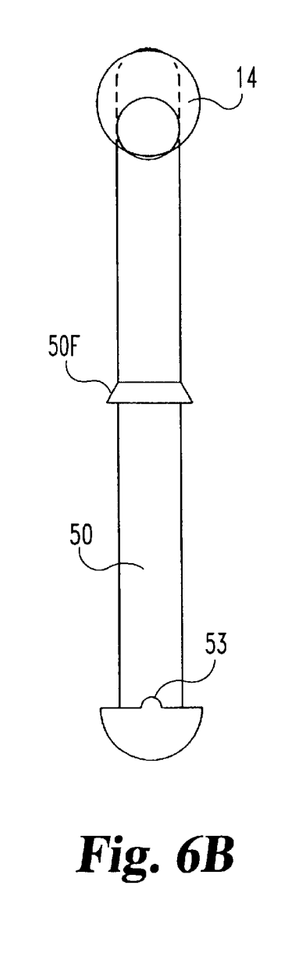
Figure 7A:
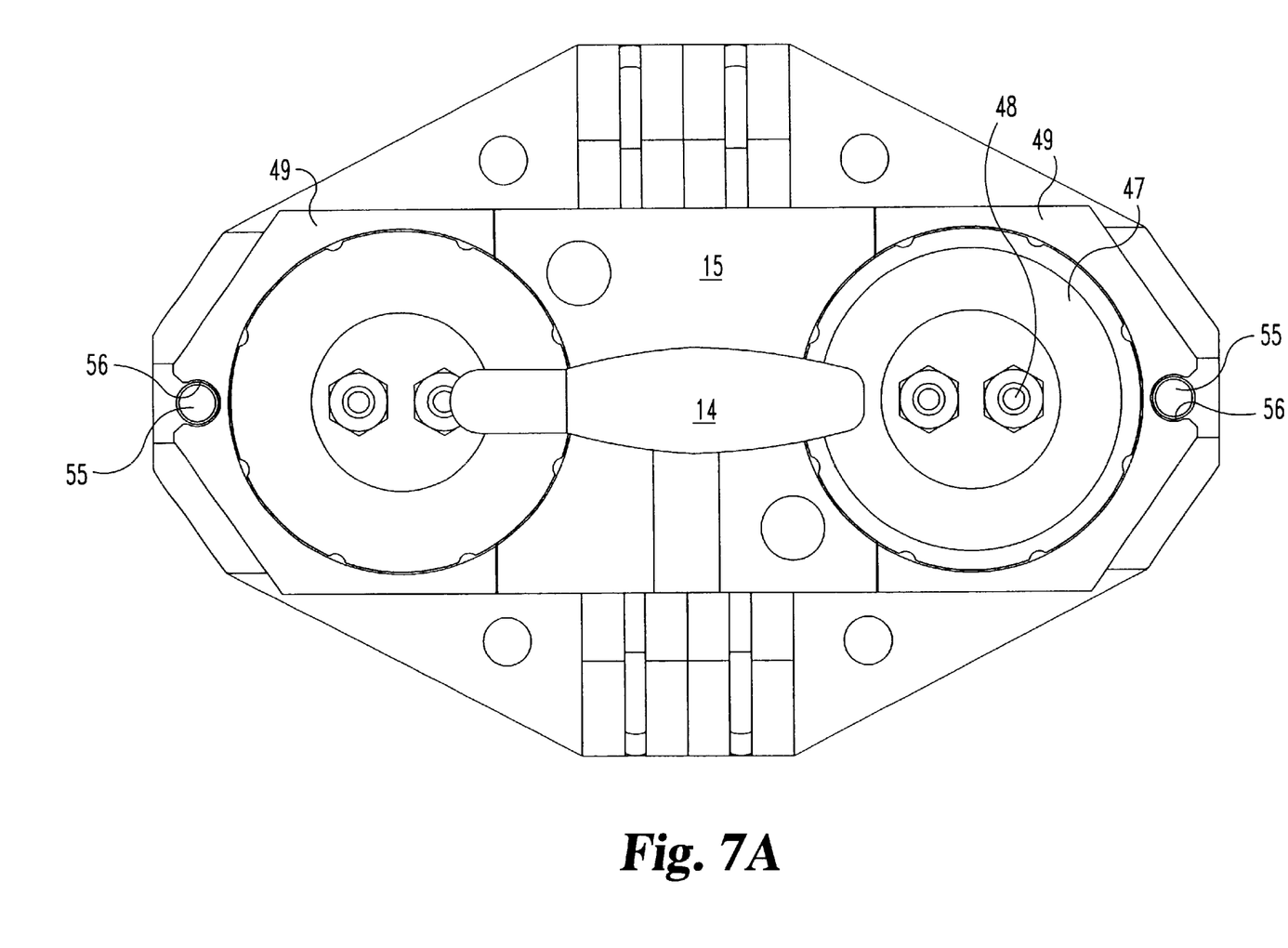
FIG. 7A and FIG. 7B are top plan views of the chlorine generator of the present invention, according to one preferred embodiment, showing the handle locked in the "cross" (7A) and "forward" (7B) orientations.
Figure 7B:
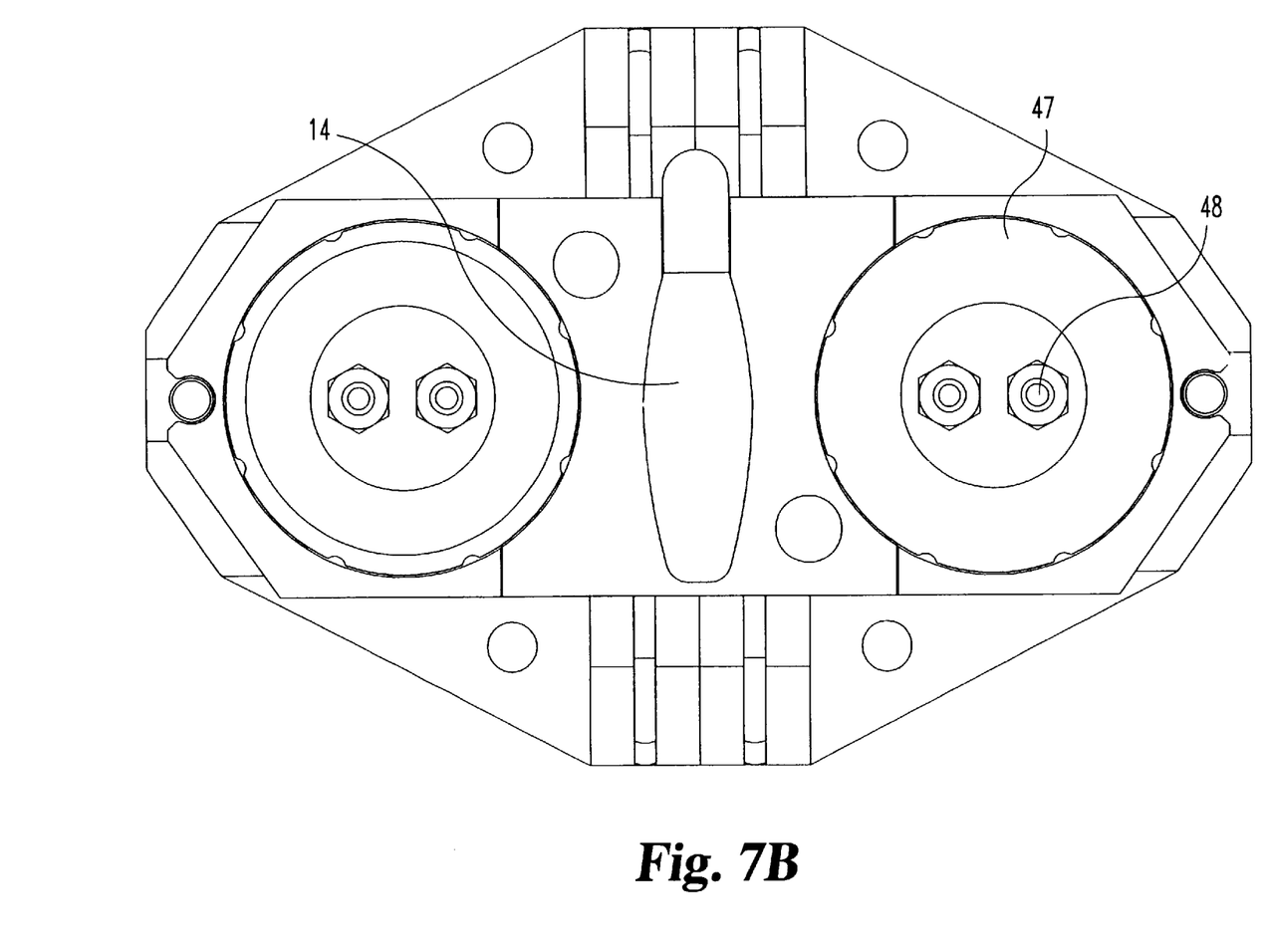

To facilitate carrying the generator, a handle 14 is provided. In the illustrated embodiment, handle 14 is supported by handle support 15 as shown in FIG. 2. In that embodiment handle support 15 includes two pairs of indents 52 (FIG. 5) that receive handle tabs 53 (FIGS. 6A and 6B) so that the handle may be "locked" into position without swiveling. When the handle is pushed downward, the tabs are disengaged from the indents, and the handle is free to swivel. Preferably, the pairs of indents 52 are positioned to "lock" the handle either parallel (FIG. 7A) or perpendicular (FIG. 7B) to passageway 16. When not in use, handle 14 is supported by engagement of flange 50F (FIGS. 1 and 6A and 6B) with the top of handle support 15. When pulled up, the tabs 53 engage the bottom of handle support 15 to lift and carry the unit.

In the illustrated embodiment handle support 15 is connected to bridge 49. The bridge/support assembly therefore has three apertures in it. Two of them receive liquid-holders 12 and 13, and may engage with flanges 12A and 13A of the liquid-holders to provide a stable support. Handle support 15 may be fastened with fasteners, such as screws, bolts, or pins, to the top of the bridge 49 so that it clamps flanges 12A and 13A to bridge 49.

Sight tubes 55 may be included, and may be connected to nipples 32 at their lower end, and to sight-tube holders 56 molded into bridge 49 at their upper end. The sight tubes serve several functions. First, they allow the user to observe the level of liquid in liquid-holders 12 and 13 since the sight tubes are in fluid communication with the liquid contained therein. Second, sight tubes 55 may be used to inject water or some other fluid into the liquid holders, particularly when it is desired to clean them. Sight tube holders 56 may be open at the end of bridge 49 so that the sight tubes are easily snapped into and out of place in the holders. In that embodiment, the open end of the sight tube holders preferably provide a gap of slightly less width than the diameter of the sight tubes.

As to the operation of the chlorine generator, passageway 16 is preferably filled with water through liquid-holders 12 and 13. A chloride salt, such as common table salt, is then added to the anode end 19 of passageway 16. Liquid-holder cap 47 is placed on liquid-holder 12, and gas outlet 48 is attached to a chlorine gas delivery means such as a venturi tube. Liquid-holder 13 may be left open to the atmosphere.

A power supply is then connected to the electrodes. The positive cable of the power supply is connected to tab 39 of anode 22, and the negative cable is connected to tab 39 of cathode 23.

The flow of water through, for example, a venturi (not shown) is started until adequate flow produces suction on the liquid-holder that communicates with the anode end of the passageway. Power is then applied to the power supply. The unit should be run for several minutes and the water coming out of the venturi should be tested by methods known in the art for the presence of chlorine.

During electrolysis, chlorine gas is liberated at anode 22, and bubbles to the surface of the anolyte in liquid-holder 12. From there it is removed and is injected into the water to be treated through the chlorine gas delivery means. Sodium hydroxide forms in cathode chamber 23, and hydrogen gas is produced. The hydrogen gas may be allowed to escape to the atmosphere, or it may be captured or directed as desired.

In the preferred embodiments, the concentration of sodium hydroxide is kept below about 5 percent (by weight) by frequently changing the water in the cathode end of the passageway. When replacing the water, it is preferred to leave some sodium hydroxide residue in order to better conduct electricity.

Salt must be added periodically, as it is used by the generator. Water in the passageway must also be replaced.

The amount of chlorine generated per minute is dependent on the spacing between the electrodes and the amount of power supplied but is typically in the range of about $3 \times 10^{-5}$ lb/min. to about $2.5 \times 10^{-4}$ lb/min. For example, when the spacing between the electrodes is about 1.27 cm (0.5 in), and a voltage of about 7 volts is applied, about $1.8 \times 10^{-4}$ lb/min. of chlorine is produced. This amount of chlorine is sufficient to treat about 40 gallons of water per minute.

The apparatus can be powered with any power supply as known in the art, including a DC power supply, battery or battery charger. The electrolytic cell is preferably powered by about 6 to about 12 volts DC, however, about 3 volts DC will also adequately power the cell. Moreover, the cell can be powered with full wave or half wave pulsed DC, however, if half wave pulsed DC is used to power the cell, the chlorine gas output will be reduced by half.

In order to improve system performance, the apparatus should be kept running on a regular basis; long periods of disuse may cause more problems. Furthermore, the ionselective membrane 40 should not be allowed to dry once it has been used. If the membrane must be taken out of the electrolytic cell for any reason, the membrane and electrodes must be rinsed and the membrane must be stored wet between two inert flat surfaces.

While the invention has been illustrated and described in detail in the drawings and foregoing description, this is to be considered illustrative and not restrictive. It is to be understood that only the preferred embodiments have been shown and described. All modifications and equivalents of the elements of the disclosed invention that come within the spirit of the invention as defined by the following claims are contemplated and their protection is desired.

What is claimed is:

1. A chlorine generator, comprising:
    (a) a base having a passageway therein, with said passageway having a first end portion and a second end portion;
    (b) a first liquid-holder extending upward from said base and in fluid communication with said first end portion of the passageway, and a second liquid-holder extending upward from said base and in fluid communication with said second end portion of the passageway;
    (c) an anode disposed in said first end portion of the passageway, said anode comprising:
        (i) an electrolyte-contacting portion shaped to cover said passageway;
        (ii) an electrical connection portion extending outward from said electrolyte-contacting portion; and
        (iii) an electrode-holder portion substantially surrounding the outer edge of the anode;
    (d) a cathode disposed in said second end portion of the passageway, said cathode comprising:
        (i) an electrolyte-contacting portion shaped to cover said passageway;
        (ii) an electrical connection portion extending outward from said electrolyte-contacting portion; and
        (iii) an electrode-holder portion substantially surrounding the outer edge of the cathode;
    (e) an ion-selective membrane in said passageway between said anode and said cathode, said ion-selective membrane being effective for preventing the passage of chloride ions through said membrane;

(f) a gas outlet communicating with said first liquid holder; and (g) a handle and a handle support member, wherein said handle support member includes at least one indent, and wherein said handle includes at least one tab that fits in said at least one indent to lock the handle in a selected position.

2. The chlorine generator of claim 1 wherein said anode is made of expanded titanium.

3. The chlorine generator of claim 1 wherein said electrode holders are made of a non-conductive material, and include ribs and grooves that cooperate to provide a tight seal around the ion-selective membrane when the two electrodes are pressed together.

4. The chlorine generator of claim 1 wherein the electrolyte-contacting portion of the anode and the electrical connection portion of the anode are made from a single piece of expanded metal.

5. The chlorine generator of claim 1 wherein the electrolyte-contacting portion of the cathode and the electrical connection portion of the cathode are made from a single piece of expanded metal.

* * * * *